Jan. 3, 1928.　　　　　C. J. MUEND　　　　　1,654,550
VALVE CONTROL
Filed Feb. 26, 1927
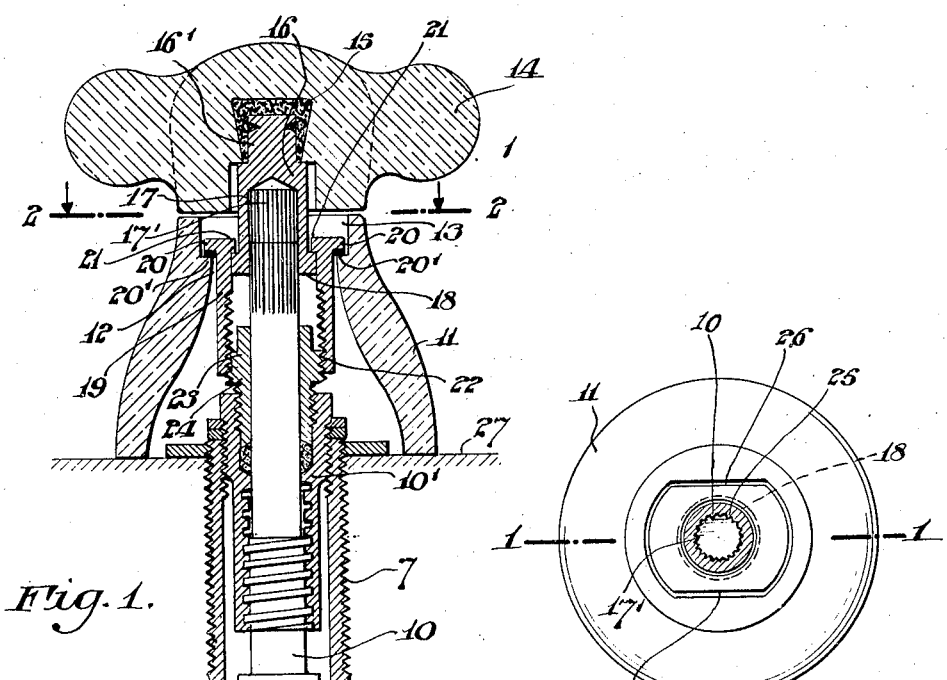
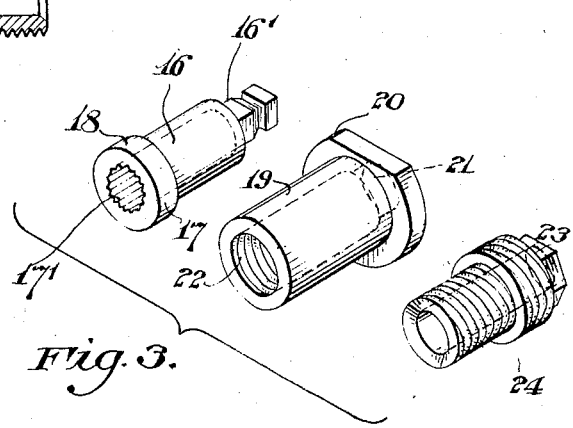
Inventor:
Charles J. Muend,
By
Attorney.

Patented Jan. 3, 1928.

1,654,550

UNITED STATES PATENT OFFICE.

CHARLES J. MUEND, OF PHILADELPHIA, PENNSYLVANIA, ASSIGNOR, BY MESNE ASSIGNMENTS, TO HAJOCA CORPORATION, A CORPORATION OF DELAWARE.

VALVE CONTROL.

Application filed February 26, 1927. Serial No. 171,094.

The invention relates to improvements in valve control. The object is to provide improved means for associating the controlling handle, the valve spindle and the escutcheon. The invention is especially applicable to vitreous china handle and escutcheon, whereby these elements are associated to conceal all metallic parts.

Referring to the drawings which illustrate merely by way of example a suitable or preferred embodiment of my invention;—

Fig. 1 is a longitudinal section on line 1, 1 of Fig. 2.

Fig. 2 is a cross-section on line 2, 2 of Fig. 1.

Fig. 3 is a perspective view of three of the cooperating elements disassociated.

Similar numerals refer to similar parts throughout the several views.

The housing 7, valve seat 8, valve 9 and valve spindle 10 and the cooperating threaded spindle sleeve 10' are of usual construction.

The escutcheon 11, preferably of vitreous china, is of hollow formation, and provided with the central opening 12 at its outer side, with a countersunk recess 13 surrounding opening 12.

The handle 14, also preferably of vitreous china, is provided with a central recess 15, into which is secured, by any suitable means, the element 16. This element 16, preferably of metal, is provided with a central bore 17 with longitudinally extending grooves 17', and a peripheral flange 18 at its outer end. This element 16 extends outwardly a considerable distance beyond the body of the handle 14.

A sleeve element 19 is provided with an exterior flange 20 and an interior flange 21, at one end and an interior thread 22 extending from the other end, for engaging an enlarged threaded portion 23 of the gland 24.

The outer end of the spindle 10 is provided with longitudinal ribs 25 for cooperating with the grooves 17' of element 16, to permit independent longitudinal movement between the two, but to prevent independent rotative movement.

The outer flange 20 of element 19 has flattened sides as at 26, Fig. 2, and the countersunk recess 13 is correspondently shaped to fit the flange 20 as shown, so as to prevent independent rotative movement between the escutcheon 11 and sleeve 19. The fit between flange 20 and recess 13 is a reasonably loose fit to allow play between the elements for the purpose to be described.

The assembly operation:

The element 16 is inserted into and partly through element 19, so that the flange 18 of element 16 may engage the interior flange 21 of element 19. The outer end 16' of element 16 is then inserted in recess 15 of handle 14 and secured therein by any suitable means. The sleeve element 19 is then inserted into the opening 12 of escutcheon 11, with the flange 20 fitting loosely in the countersunk portion 13, at the same time that the spindle 10 is inserted in the bore 17 of element 16. The sleeve element 19 is then threaded onto the threaded portion 23 of gland 24. The sleeve is turned by turning the escutcheon 11, until the inner edge or margin of the escutcheon is drawn snugly against the surface, such as 27, with which it is to engage. The loose fit between the sleeve 19 and escutcheon 11 permits a slight tilting of the escutcheon, relatively to the valve casing, to enable the inner margin of the escutcheon to conform to the plane of the surface 27.

As the flange 20, engaging the cooperating shoulder 20' of the escutcheon, draws the escutcheon into place, the interior flange 21 engaging the flange 18 of element 16, draws the handle into close proximity to the outer face of the escutcheon as shown in Fig. 1.

By this arrangement I obviate the necessity of permanently securing any metal element permanently to the inner side of the escutcheon. Such metal element is objectionable because it has a tendency to crack the china escutcheon; due to unequal expansion, and also because it is liable to become disengaged from the escutcheon. By the present arrangement the assembly is much more easily made, is less expensive and the escutcheon is adapted to conform to surfaces that may be more or less irregular.

What I claim is:—

1. In a device of the character described, the combination of a valve casing, a valve spindle, a spindle actuating handle, means associated with the handle for securing a fixed rotative relationship, and permitting independent longitudinal movement between the handle and spindle, an escutcheon having an opening therethrough, a sleeve projecting through the opening, in threaded relationship with the valve casing and having a flange engaging the escutcheon and another flange in operative relationship with the handle.

2. In a device of the character described, the combination of a valve casing, a valve spindle, a spindle actuating handle, means associated with the handle for securing a fixed rotative relationship, and permitting independent longitudinal movement between the handle and spindle, an escutcheon having an opening therethrough, and a countersunk recess surrounding the opening, a sleeve projecting through the opening, in threaded relationship with the valve casing and having a flange seated in said recess and another flange in operative relationship with the handle.

3. In a device of the character described, the combination of a valve casing, a valve spindle, a spindle actuating handle having a flanged spindle engaging element secured thereto, an escutcheon having an opening therethrough, a sleeve projecting through the opening, in threaded relationship with the valve casing and having a flange engaging the escutcheon and another flange engaging the flanged spindle engaging element.

4. In a device of the character described, the combination of a valve casing, a valve spindle and a gland, a spindle actuating handle, means associated with the handle for securing a fixed rotative relationship, and permitting independent longitudinal movement between the handle and spindle, an escutcheon having an opening therethrough, a sleeve projecting through the opening and threaded onto the gland and having a flange for engagement with the escutcheon and a flange in operative relationship with the handle.

CHARLES J. MUEND.